US006969203B2

(12) United States Patent
Low

(10) Patent No.: US 6,969,203 B2
(45) Date of Patent: Nov. 29, 2005

(54) OPTICAL FIBER RECEPTACLE, AN OPTICAL FIBER FERRULE AND AN OPTICAL FIBER RECEPTACLE AND FERRULE INTERCONNECTION SYSTEM

(75) Inventor: Alvin H. S. Low, Singapore (SG)

(73) Assignee: Agilent Technologies, Inc., Palo Alto, CA (US)

( * ) Notice: Subject to any disclaimer, the term of this patent is extended or adjusted under 35 U.S.C. 154(b) by 284 days.

(21) Appl. No.: 10/425,162

(22) Filed: Apr. 29, 2003

(65) Prior Publication Data

US 2004/0218872 A1 Nov. 4, 2004

(51) Int. Cl.[7] .............................................. G02B 6/26

(52) U.S. Cl. ..................... 385/78; 385/53; 385/60; 385/83; 385/84; 385/88; 385/92; 385/76; 385/77

(58) Field of Search ........................... 385/53, 70, 78, 385/81, 83, 84, 88, 92, 60, 76, 77

(56) References Cited

U.S. PATENT DOCUMENTS

| 4,134,641 | A | * | 1/1979 | Kao et al. ..................... 385/70 |
| 5,337,392 | A | * | 8/1994 | Mousseaux et al. .......... 385/90 |
| 5,633,971 | A | * | 5/1997 | Kurashima .................... 385/78 |
| 5,717,801 | A | * | 2/1998 | Smiley ........................ 385/60 |
| 2003/0063868 | A1 | * | 4/2003 | Fentress ....................... 385/78 |
| 2003/0128937 | A1 | * | 7/2003 | Sato et al. .................... 385/78 |
| 2004/0218872 | A1 | * | 11/2004 | Low ............................. 385/60 |

* cited by examiner

Primary Examiner—Brian M. Healy

(57) ABSTRACT

An optical fiber receptacle and ferrule interconnection system is disclosed. The interconnection system includes an optical fiber ferrule and a receptacle. The receptacle has a first portion that is attachable to an optical device and a second portion that is connected to the first portion. The second portion has an inner surface that defines a slot for detachably receiving the optical fiber ferrule and for aligning the optical fiber within the optical fiber ferrule with an attached optical device to allow transmission of light therebetween. The slot provides an interference fit with the ferrule. The inner surface of the second portion and an outer surface of the ferrule are adapted to form at least one channel therebetween.

19 Claims, 4 Drawing Sheets

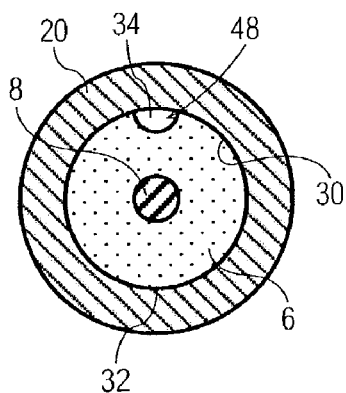
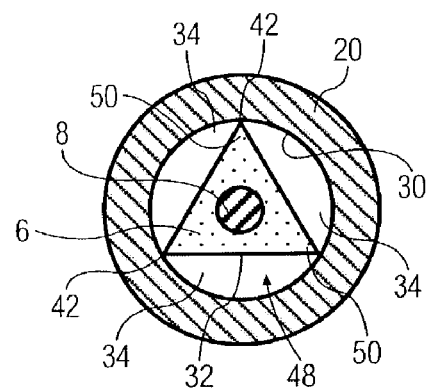
*FIG. 9*  *FIG. 12*
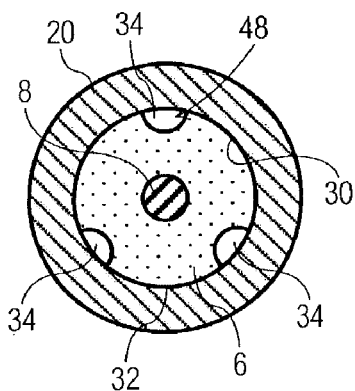
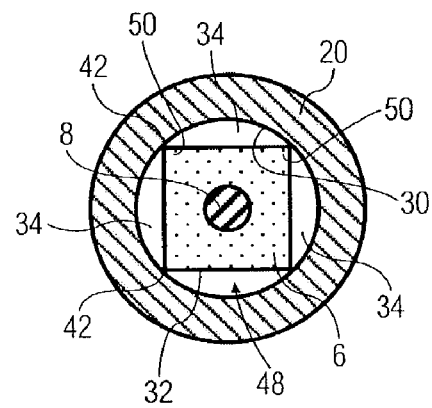
*FIG. 10*  *FIG. 13*
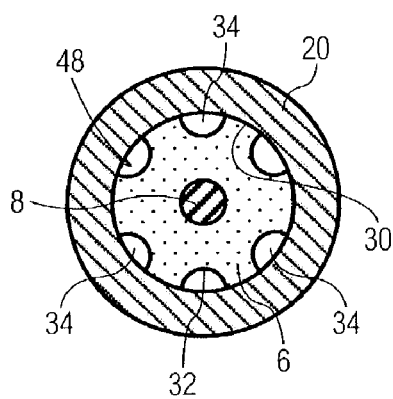
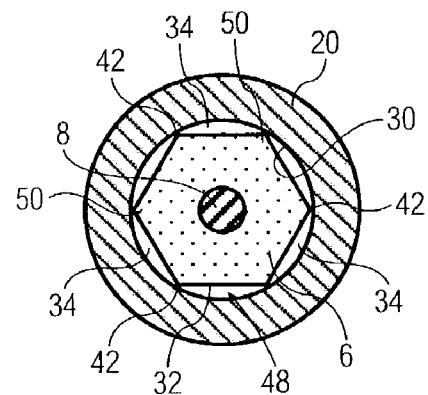
*FIG. 11*  *FIG. 14*

OPTICAL FIBER RECEPTACLE, AN OPTICAL FIBER FERRULE AND AN OPTICAL FIBER RECEPTACLE AND FERRULE INTERCONNECTION SYSTEM

BACKGROUND

This invention relates to an interconnection system involving an optical fiber receptacle and an optical fiber ferrule. More particularly, this invention relates to an optical fiber receptacle for attaching to an optical device and for receiving and aligning an optical fiber ferrule with the optical device.

Prior art optical fiber receptacles, which are also known as optical fiber ports, include a first portion for attaching to an optical device and a second portion with a slot defined therein for receiving and aligning an optical fiber ferrule with the optical device. For example, in optical fiber receptacles used in SC and LC type connectors, the slot typically has a circular cross section having a diameter in the range of 2.501–2.509 mm. The ferrule used in connection with the optical fiber receptacle typically has a circular cross section having a diameter in the range of 2.4985–2.4995 mm. That is, even when the cross section of the slot has a minimum diameter of 2.501 mm and the cross section of the ferrule has a maximum diameter of 2.4995 mm, there is still a clearance of 0.0015 mm between a surface that defines the slot and a surface that defines the ferrule. This clearance provides a slightly loose or clearance fit for facilitating insertion and drawing of the ferrule into and out of the slot of the receptacle respectively. The manufacturing tolerances of both the slot and the ferrule are tightly controlled such that in a worst case, where the diameter of the slot has a maximum diameter of 2.509 mm and the ferrule has a minimum diameter of 2.4995 mm, the transmission of light between the optical device and an optical fiber in the ferrule is still at an acceptable level. Although such a connection works, transmission of light between the optical device and the optical fiber is not optimal. Therefore, there is room for improvement in the design of the receptacle, the ferrule, or both the receptacle and the ferrule to provide for a more optimal alignment of the optical fiber within the ferrule with the optical device.

SUMMARY

According to an aspect of the invention, there is provided an optical fiber receptacle and ferrule interconnection system. The receptacle has a first portion that is attachable to an optical device and a second portion that is connected to the first portion. The second portion has an inner surface that defines a slot for detachably receiving the optical fiber ferrule and for aligning an optical fiber that is carried by the optical fiber ferrule, with the attached optical device to allow transmission of light therebetween. The slot has an internal diameter that is smaller than an external diameter of the optical fiber ferrule.

According to another aspect of the invention, there is provided an optical fiber receptacle as described above.

According to yet another aspect of the invention, there is provided an optical fiber ferrule as described above.

BRIEF DESCRIPTION OF DRAWINGS

The invention will be better understood with reference to the drawings, in which:

FIG. 9 is a cross sectional view, similar to FIG. 3, of a ferrule having a non-circular cross section shown received in a circular cross section slot of a tubular portion of a receptacle, according to yet another embodiment of the invention, wherein an outer surface of the ferrule includes a groove to define a single channel;

FIGS. 10 and 11 are cross sectional views, similar to FIG. 9, wherein three and six grooves are formed respectively on the outer surface of the ferrule in FIG. 9, the grooves being angularly spaced-apart about an axis of the ferrule;

FIGS. 12–14 are cross sectional views, similar to FIG. 9, of the circular cross section slot of the tubular portion of the receptacle in FIG. 9 shown with a ferrule according to yet further embodiments of the invention received therein, wherein the ferrule has a triangular, square and hexagonal cross section respectively.

DETAILED DESCRIPTION

An optical fiber receptacle and ferrule interconnection system according to the invention includes an optical fiber ferrule having an optical fiber therein and an optical fiber receptacle. The optical fiber receptacle includes a first portion connected to a second portion. The first portion is attachable to an optical device for attaching the receptacle to the optical device. The second portion has an inner surface that defines a slot. During use, this slot detachably receives the optical fiber ferrule and aligns the optical fiber, carried by the optical fiber ferrule, with an optical device attached to the first portion. Such alignment of the optical fiber with an optical device allows transmission of light between the optical fiber and the optical device. The slot has an internal diameter that is smaller than an external diameter of the optical fiber ferrule. The slot thus provides an interference fit with the optical fiber ferrule when receiving the ferrule into the slot. By an interference fit, it is meant that the ferrule and the slot are dimensioned such that the insertion of the ferrule into the slot is opposed and a certain amount of force is required to insert the ferrule into the slot. In some embodiments, at least a part of the inner surface of the second portion and at least a part of an outer surface of the ferrule are adapted to form at least one channel therebetween. In other words, at least one channel is provided at a boundary defined by the inner surface of the second portion and the outer surface of the ferrule. The channel allows passage of displaced fluid, such as liquid and air or other gases, therethrough into and out of the slot when inserting and drawing the ferrule into and out of the slot respectively.

Figure 1:
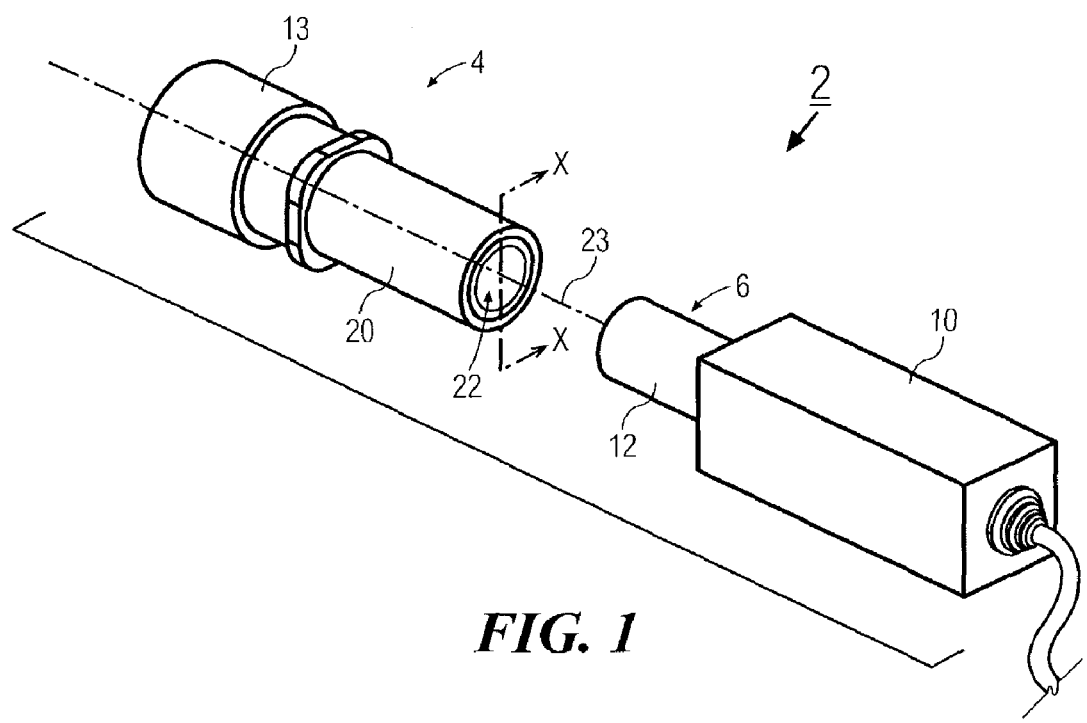
FIG. 1 is an isometric drawing of an optical fiber receptacle and a portion of an optical fiber cable having an optical fiber whose end portion is encased in a ferrule, according to an embodiment of the invention, wherein the optical fiber receptacle has a slot for receiving the ferrule.
Figure 2:
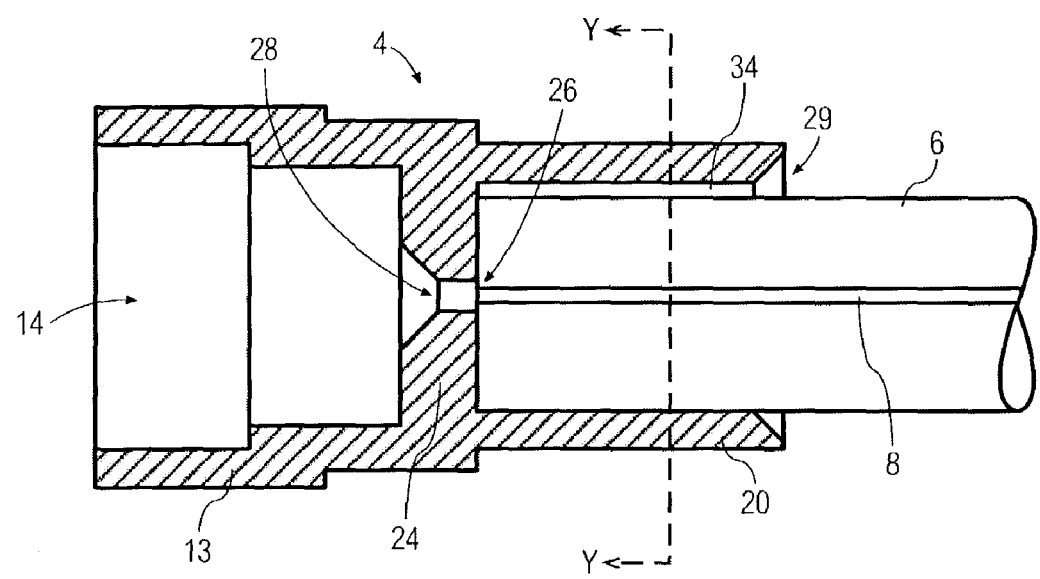
FIG. 2 is a cross sectional view of the optical fiber receptacle and the optical fiber ferrule in FIG. 1 taken along a line X—X in FIG. 1, showing a portion of the ferrule received in the slot of the receptacle.
Figure 3:
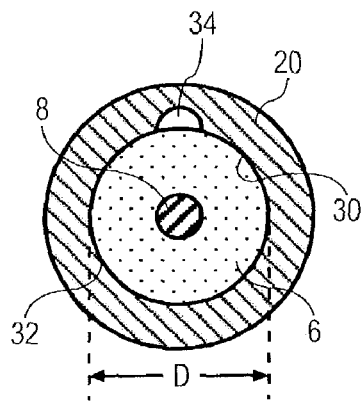
FIG. 3 is a cross sectional view of a tubular portion of the optical fiber receptacle in FIG. 1 and a ferrule having a circular cross section received therein, taken along a line Y—Y in FIG. 2, wherein an inner surface of the receptacle which defines the slot includes a groove thereon that defines a single channel.

With reference to FIGS. 1–3, an optical fiber receptacle and ferrule interconnection system 2, according to an embodiment of the invention, includes an optical fiber receptacle 4 (also known as a port) and an optical fiber ferrule 6 (hereinafter referred to simply as a receptacle 4 and a ferrule 6 respectively for ease of description).

The ferrule 6 has a bore defined therein for receiving an end portion of an optical fiber 8 (FIG. 2) of an optical fiber cord (not shown). The ferrule 6 includes a first portion (not shown) that is attachable to a housing 10 of a connector 11. Examples of such a connector 11 includes, but is not limited to, an SC and an LC type optical fiber connector known to those skilled in the art. The ferrule 6 also includes a second end portion 12 that is connected to the first portion. An exposed tip of the optical fiber 8 at this second end portion 12 is processed to define a specular surface. The ferrule 6 may be fabricated of a single piece of material. Hereinafter, unless otherwise specified, any reference to a ferrule 6 should be taken to refer to this second end portion 12 of the ferrule, for ease of description.

The receptacle 4 includes a first tubular portion 13 having a first slot 14 defined therein for attaching to an optical device or an opto-electronic device. The optical device may for example be an optical coupling device, and the opto-electronic device may for example be either an optical transmitter or an optical receiver. The receptacle 4 also includes a second tubular portion 20 having a second slot 22 defined therein for receiving the ferrule 6. The second tubular portion 20 is connected to the first tubular portion 13 such that the first slot 14 is axially aligned with the second slot 22 along an axis 23 of the receptacle 4. The second tubular portion 20 includes a constriction 24 at an inner end 26 of the second slot 22 for maintaining the ferrule 6 received within the second slot 22 at a predetermined distance from an attached optical device or opto-electronic device. The constriction 24 has a through hole 28 that optically connects the first slot 14 and the second slot 22 of the receptacle 4 to form a light channel therebetween. A leading end 29 of the second slot 22 is countersunk to guide the ferrule 6, during insertion of the ferrule 6, into the slot 22. During use, the second slot 22 detachably receives the ferrule 6 and aligns the ferrule 6, thereby aligning the optical fiber 8 in the ferrule 6, with an optical device attached to the first portion 13 to allow transmission of light therebetween. In this manner, optical connectivity or coupling between the optical device and the optical fiber 8 is achieved.

In this embodiment, the second slot 22 may have an internal diameter, D shown in FIG. 3, between 2.4905–2.4913 mm and the ferrule may have an external diameter (also shown as D in FIG. 3) between 2.4985–2.4995 mm. That is, even in a case when the internal diameter of the second slot 22 is at its maximum of 2.4913 mm and the external diameter of the ferrule is at it minimum of 2.4985 mm, an inner surface 30 of the second portion 20 of the receptacle 4, which defines the second slot 22, still abuts an outer surface 32 of the ferrule 6 to result in an interference fit of the ferrule 6 within the second slot 22. The external diameter of the ferrule 6 is generally slightly larger than the internal diameter of the second slot 22 to effect such an interference fit. Accordingly, it should be understood that the above values of the internal diameter of the second slot 22 and the external diameter of the ferrule 6 are only for illustrative purposes. It should not be construed that the diameters are limited to only these values. Other values are also possible for providing an interference fit of the ferrule 6 within the second slot 22.

In this embodiment, as shown in FIG. 3, the second portion 20 includes a longitudinal groove 34 on the inner surface 30 thereof. The groove 34 extends substantially parallel to the axis 23 of the slot 22 to define a channel 34 between the second portion 20 and the ferrule 6 received in the slot 22. As previously mentioned, this channel 34 allows displaced fluid to flow therethrough into and out of the second slot 22 when inserting and drawing the ferrule 6 into and out of the second slot 22 respectively.

As can be seen in FIG. 3, with only one single channel 34 defined in the second portion 20 of the receptacle 4, the inner surface 30 of the second portion 20 is able to stretch a little to accommodate and tightly wrap around the ferrule 6, thereby centering the ferrule 6 within the second slot 22. In this manner, the optical fiber 8 in the ferrule 6 is aligned along the axis 23 of the receptacle 4. However, such an arrangement defines a relatively large contact area between the inner surface 30 of the receptacle 4 and the outer surface 32 of the ferrule 6. The resultant friction between the two surfaces 30, 32 when inserting the ferrule 6 into and drawing the ferrule out of the second slot 22 may inhibit movement of the ferrule 6 within the second slot 22.

Figure 4:
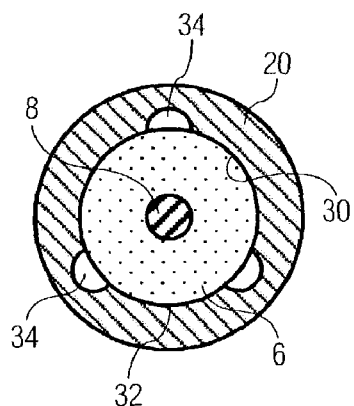
FIGS. 4 and 5 are cross sectional views, similar to FIG. 3, showing the inner surface of the receptacle in FIG. 3 having three and eight grooves formed thereon respectively, wherein the grooves are angularly spaced-apart about an axis of the receptacle.
Figure 5:
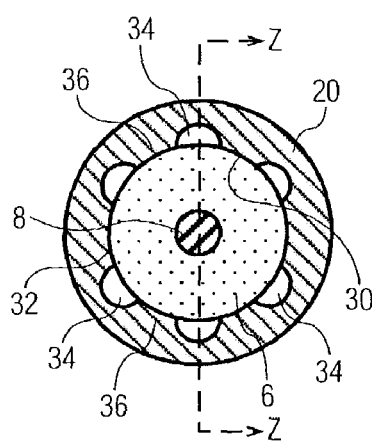

To reduce the contact area and thus friction between the inner surface 30 of the receptacle 4 and the outer surface 32 of the ferrule 6, more than one groove 34 may be defined in the second portion 20 of the receptacle 4. For example, as shown in FIG. 4, three grooves 34 are formed in the second portion 20 of the receptacle 4. These grooves 34 are angularly spaced apart about the axis 23 of the slot to define at least three angularly spaced-apart channels 34 between the inner surface 30 of the second portion 20 of the receptacle 4 and the outer surface 32 of the ferrule 6. Such provision of more than one channel 34 reduces the contact area between the inner surface 30 of the receptacle 4 and the outer surface 32 of the ferrule 6. As expected, further reduction of the contact area can be achieved by increasing the number of grooves 34, for example, to eight grooves as shown in FIG. 5. When the inner surface 30 is provided with grooves 34 in such a manner, the areas of the second portion 20 between adjacent grooves 34 define elongated ribs 36 for engaging the ferrule 6.

Figure 6:
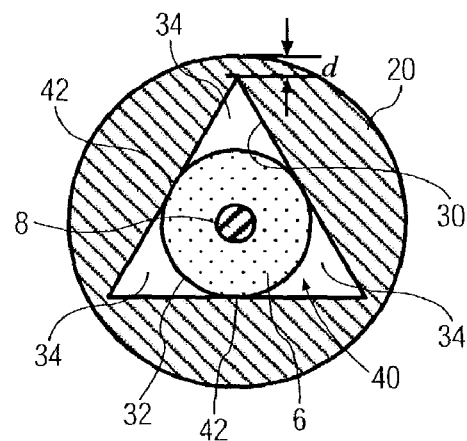
FIGS. 6–8 are cross sectional views, similar to FIG. 3, of the circular cross section ferrule in FIG. 3 shown received in a slot of a receptacle according to other embodiments of the invention, wherein the slot has a triangular, a square and a hexagonal cross section respectively.

Other embodiments of the receptacle 4 may also be used to receive the ferrule 6 in the above-described manner. With reference to FIG. 6, instead of forming one or more grooves 34 on an inner surface 30 of a circular cross section second slot 22 as shown in FIGS. 3–5, a second slot 40 having a polygonal, in this case triangular, cross section may be formed within the second portion 20 of the receptacle 4. This slot 40 of triangular cross-section is dimensioned such that the three sides of the triangular cross section encompass a circle having the above-mentioned internal diameter that is smaller than the external diameter of the ferrule 6, so as to receive the ferrule 6 within the slot 40 with an interference fit. When viewed cross-sectionally, the inner surface 30 defining the slot 40 abuts the ferrule 6 at three angularly spaced-apart positions 42 when the ferrule 6 is received within the slot 40. The contact area between the inner surface 30 of the second portion 20 of the receptacle 4 and the outer surface 32 of the ferrule 6 is thus greatly reduced. Spaces in the slot 40 that are unoccupied by the received ferrule 6 define three angularly spaced-apart channels 34 around the ferrule 6. The outer diameter of the second portion 20 of the receptacle 4 is substantially increased to properly accommodate such a slot 40 to ensure that the slot 40 is surrounded by receptacle material of a minimum thickness, d.

Figure 7:
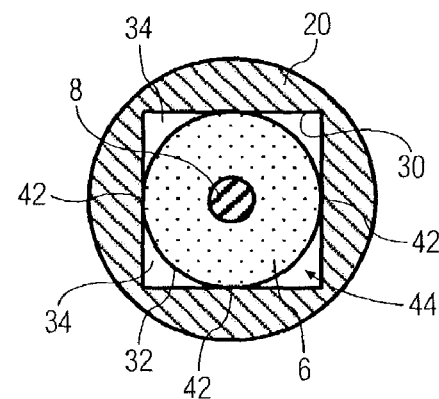
Figure 8:
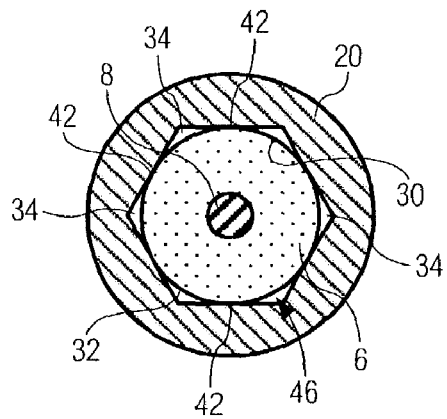

To reduce the outer diameter of the second portion 20 of the receptacle 4, a slot 44 of a polygonal cross section having more sides, such as a square cross section, as shown in FIG. 7, may be provided instead. The length of the sides of the square is equal to the internal diameter. With such a slot 44 of a square cross section, the ferrule 6 is held or supported cross sectionally within the slot 44 at four angularly spaced-apart positions 42. To further reduce the outer diameter of the second portion 20 of the receptacle 4, a slot 46 of a hexagonal cross section as shown in FIG. 8, may be provided. Accordingly, with such a slot 46, the ferrule 6 is held cross sectionally within the slot 46 at six angularly spaced-apart positions 42 to provide an interference fit. In such a case, the diameter of the ferrule 6 is slightly larger than a distance, equal to the internal diameter, between two opposing sides of the hexagonal slot 46. It should be appreciated that a slot may have a polygonal cross section of other shapes including, but not limited to, a pentagon and an octagon. The slot is dimensioned such that the sides of the polygon encompass a circle having the internal diameter. Generally, the inner surface defining the slot abuts a received ferrule cross sectionally at a number of angularly spaced-apart positions corresponding to the number of sides of the polygonal cross section.

The embodiments described above involve different configurations of a second slot 22, 40, 44, 46 defined in the second portion 20 of the receptacle 4 for receiving a ferrule 6 having a circular cross section. Other embodiments of the invention involving several configurations of a ferrule 6 that is receivable within a second slot of a circular cross section having the internal diameter may also be used. The ferrule 6 according to these other embodiments has a non-circular cross section having an external diameter that is defined by a diameter of a circle that encompasses the non-circular cross section.

With reference to FIGS. 9–11, the ferrule 6 includes at least one groove 34 on an outer surface 32 thereof that extends substantially parallel to an axis of the ferrule 6 to define at least one channel 34. FIGS. 9–11 show the ferrule 6 having one, three and six grooves 34 respectively. When inserted into and drawn out of a circular cross section slot 48 having the internal diameter, these grooves 34 allow passage of displaced fluid therethough into and out of the slot 48 respectively. As with the configurations shown in FIGS. 3–5 described earlier, the contact area between the inner surface 30 and the outer surface 32 of the ferrule 6 is reduced with the provision of more grooves 34 on the outer surface 32 of the ferrule 6.

Alternatively, the ferrule 6 may have a polygonal cross section, such as a triangular, a square, a hexagonal, an octagonal cross section that define angles 50 of the ferrule 6 to further reduce the contact area between the outer surface 32 of the ferrule 6 and the inner surface 30 of the receptacle 4. The polygonal cross-section is dimensioned such that the sides of the polygonal cross-section are encompassed by a circle having the external diameter. In this manner, when received within the circular cross section slot 48, the angles 50 abut an inner surface 30 of the receptacle 4 that defines the slot 48. Spaces in the slot 48 that are unoccupied by the received ferrule 6 define a number of angularly spaced-apart channels 34, corresponding to the number of sides of the polygonal cross section, around the ferrule 6.

The first portion 12 and second portion 20 of the receptacle 4 may be integrally molded to result in a unitary design. Any suitable molding process, such as injection molding, transfer molding or press molding, may be used to mold the receptacle 4. The receptacle 4 may be fabricated of moldable engineering polymer that has a lubricating property. An example of such a moldable engineering polymer is Delrin (a trademarked polymer available from Dupont Inc., Wilmington, Del., U.S.A.) The ferrule 6 may be fabricated of ceramic or engineering plastics such as polyetherimide (PES), polyphenylene sulfone (PPS), polyamide (PA) or an alloy resin containing any of the engineering plastics as a principal component.

Advantageously, by controlling the dimensions of the slot of the receptacle and the ferrule to provide an interference fit of the ferrule within the slot, the ferrule is more optimally aligned along an axis of the receptacle when received therein as compared to the loose or clearance fit connection in the prior art, without adversely affecting the inserting of the ferrule into and the drawing of the ferrule out of the slot.

Although the invention is described as implemented in the above-described embodiments wherein either the inner surface of the second portion of the receptacle or the outer surface of the ferrule is provided with grooves thereon that extend throughout a length of the surfaces or the cross section of either the slot or the ferrule is appropriately shaped, it is not to be construed to be limited as such. As an example, an arrangement wherein one of the two surfaces is ribbed, by providing studs thereon, will work as well.

Figure 15:
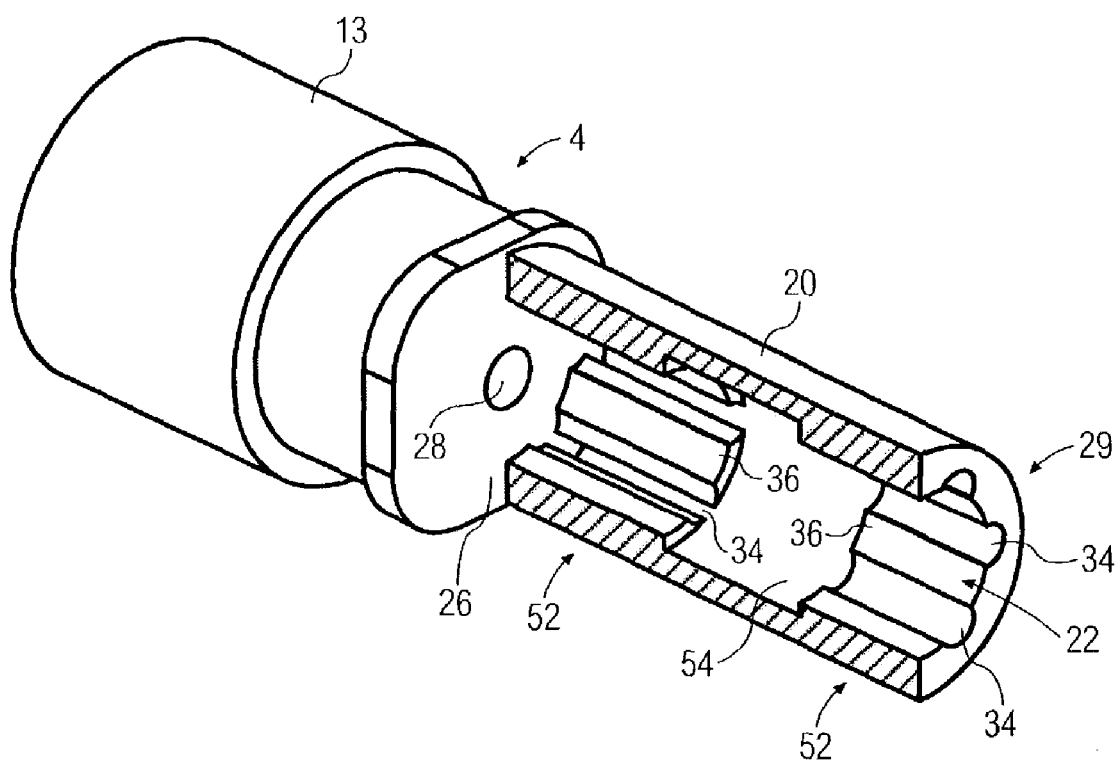
FIG. 15 is an isometric drawing of an optical fiber receptacle that has a tubular portion having an inner surface that defines a slot, wherein the inner surface includes two separate annular ribbed sections, each having a cross section as shown in FIG. 5, the tubular portion being shown sectioned along a line Z—Z in FIG. 5.

As another example, an optical fiber receptacle 4 as shown in FIG. 15 may have a second portion 20 having an inner surface 30 that is not ribbed along its entire length but only at two sections 52 to reduce contact area between the inner surface 30 and a received ferrule 6. The two ribbed sections have the above-mentioned internal diameter that is smaller than the external diameter of a received ferrule 6 to thereby provide an interference fit with a received ferrule 6. A medial section 54 having a diameter that is larger than the external diameter of a received ferrule 6 separates the two annular ribbed sections 52. This medial section 54 therefore provides a clearance fit with a received ferrule 6. Each of the ribbed sections 52 includes ribs 36. The two ribbed sections 52 are formed adjacent an inner end 26 and a leading end 29 of a slot 22 defined by the inner surface 30. Spaces between adjacent ribs 36 in the slot 22 not occupied by a received ferrule 6 define multiple channels 34.

I claim:

1. An optical fiber receptacle and ferrule interconnection system comprising:
    an optical fiber ferrule having a non-circular section and wherein an external diameter of the ferrule is defined by a diameter of a circle that encompasses the non-circular cross section; and
    a receptacle having:
        a first portion attachable to an optical device; and
        a second portion connected to the first portion, and the second portion having a slot with an internal diameter which is smaller than the external diameter.

2. An interconnection system according to claim 1, wherein the second portion has an inner surface that defines the slot, and wherein at least a part of the inner surface and at least a part of an outer surface of the ferrule are adapted to form at least one channel therebetween.

3. An interconnection system according to claim 2, wherein the second portion of the receptacle comprises at least one groove on the inner surface thereof, the at least one groove extending substantially parallel to an axis of the slot, thereby defining the at least one channel.

4. An interconnection system according to claim 2, wherein the at least a part of the inner surface comprises two sections having the internal diameter, and wherein the two sections are separated by a medial section having a diameter that is greater than the external diameter.

5. An interconnection system according to claim 4, wherein the two sections of the inner surface comprise two sections of the inner surface having a plurality of grooves thereon, the grooves extending substantially parallel to an axis of the slot, thereby defining the at least one channel.

6. An interconnection system according to claim 1, wherein the slot has a circular cross section.

7. An interconnection system according to claim 2, wherein the ferrule comprises at least one groove on an outer surface thereof that extends substantially parallel to an axis of the ferrule, the at least one groove defining the at least one channel.

8. An interconnection system according to claim 6, wherein the ferrule has a polygonal cross section that defines angles which abut the inner surface of the receptacle that defines the slot when the ferrule is received therein, and wherein spaces in the slot that are unoccupied by the received ferrule define a number of angularly spaced-apart channels, corresponding to a number of sides of the polygonal cross section, around the ferrule.

9. An optical fiber receptacle comprising:
a first portion attachable to an optical device; and
a second portion connected to the first portion, the second portion having a slot with an internal diameter for detachably receiving an optical fiber ferrule with an external diameter that is larger than the internal diameter, wherein the slot has a circular cross section for receiving an optical fiber ferrule having a non-circular cross section, and wherein the external diameter of the ferrule is defined by a diameter of a circle that encompasses the non-circular cross section.

10. An optical fiber receptacle according to claim 9, wherein the second portion has an inner surface that defines the slot, and wherein at least a part of the inner surface of the second portion and at least a part of an outer portion of a received ferrule are adapted to form at least one channel therebetween.

11. An optical fiber receptacle according to claim 10 wherein the second portion comprises at least one groove on the inner surface thereof that extends substantially parallel to an axis of the slot, thereby defining the at least one channel.

12. An optical fiber receptacle according to claim 10, wherein the at least a part of the inner surface comprises two sections of the inner surface having the internal diameter, wherein the two sections are separated by a medial section having a diameter that is greater than the external diameter of a received ferrule.

13. An optical fiber receptacle according to claim 12, wherein the two sections of the inner surface comprise two sections of the inner surface having a plurality of grooves thereon, the grooves extending substantially parallel to an axis of the slot, thereby defining the at least one channel.

14. An optical fiber receptacle according to claim 10, wherein the at least a part of the inner surface comprises at least one section of the inner surface having at least three spaced apart elongated ribs, wherein the elongated ribs engage a received ferrule such that spaces between adjacent elongated ribs in the slot left unoccupied by the received ferrule define the at least one channel.

15. An optical fiber receptacle according to claim 14, wherein the at least one section of the inner surface comprises two separate ribbed sections separated by a medial section having a diameter that is greater than the external diameter of a received ferrule.

16. An optical fiber ferrule comprising:
a bore defined therein for receiving an optical fiber;
a first portion attachable to a housing of a connector; and
a second portion, connected to the first portion, the second portion having a non-circular cross section, wherein a circle that encompasses the non-circular cross section has an external diameter that is greater than an internal diameter of a slot of an optical fiber receptacle for receiving the second portion.

17. An optical fiber ferrule according to claim 16, wherein at least a part of an outer surface of the second portion and at least a part of an inner surface of the receptacle defining the slot are adapted to form at least one channel therebetween.

18. An optical fiber ferrule according to claim 16, wherein the non-circular cross section defines a polygonal shape.

19. An optical fiber ferrule according to claim 16, wherein an outer surface of said second portion comprises channels running longitudinally therein.

\* \* \* \* \*